United States Patent
Suda

(10) Patent No.: US 9,043,105 B2
(45) Date of Patent: May 26, 2015

(54) BEHAVIOR CONTROL DEVICE FOR A COMBINATION VEHICLE

(75) Inventor: Rio Suda, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 13/147,350

(22) PCT Filed: Feb. 2, 2009

(86) PCT No.: PCT/JP2009/051722
§ 371 (c)(1),
(2), (4) Date: Aug. 1, 2011

(87) PCT Pub. No.: WO2010/087022
PCT Pub. Date: Aug. 5, 2010

(65) Prior Publication Data
US 2012/0029782 A1 Feb. 2, 2012

(51) Int. Cl.
B62D 53/04 (2006.01)
B60T 7/20 (2006.01)
B60T 8/24 (2006.01)
B60T 8/17 (2006.01)
B60T 8/1755 (2006.01)
B62D 53/08 (2006.01)

(52) U.S. Cl.
CPC .............. *B60T 7/20* (2013.01); *B62D 53/0871* (2013.01); *B60T 8/246* (2013.01); *B60T 8/1708* (2013.01); *B60T 8/1755* (2013.01); *B60T 8/248* (2013.01); *B60T 2230/06* (2013.01)

(58) Field of Classification Search
None
See application file for complete search history.

(56) References Cited

U.S. PATENT DOCUMENTS

| 3,948,544 A * | 4/1976 | Presley et al. ............... 280/455.1 |
| 5,522,652 A * | 6/1996 | Negrin et al. ................. 303/154 |
| 6,042,196 A * | 3/2000 | Nakamura et al. ................ 303/7 |
| 6,498,977 B2 * | 12/2002 | Wetzel et al. .................... 701/70 |
| 6,668,225 B2 * | 12/2003 | Oh et al. .......................... 701/70 |
| 2002/0107627 A1 * | 8/2002 | Funke et al. ..................... 701/70 |
| 2008/0208424 A1 * | 8/2008 | Hartman ......................... 701/70 |
| 2010/0063702 A1 * | 3/2010 | Sabelstrom et al. ............. 701/70 |

FOREIGN PATENT DOCUMENTS

| JP | 51-108419 A | 9/1976 |
| JP | 9-136634 A | 5/1997 |
| JP | 10-001037 A | 1/1998 |

(Continued)

*Primary Examiner* — Redhwan K Mawari
*Assistant Examiner* — Edward Torchinsky
(74) *Attorney, Agent, or Firm* — Gifford, Krass, Sprinkle, Anderson & Citkowski, P.C.

(57) ABSTRACT

There is provided a behavior control device for the prevention of a jackknife phenomenon of a combination vehicle including a tractor and a trailer pivotably coupled with the tractor, taking into account that the relative pivoting action of the trailer and tractor varies according to the magnitudes of a vehicle speed or a deceleration. The inventive behavior control device comprises a braking-driving force control portion which controls a braking-driving force of the tractor or the trailer to reduce a difference between a yaw rate of the tractor and a yaw rate of the trailer and a judgment portion which judges whether or not a braking-driving force control of the tractor or the trailer by the braking-driving force control portion is necessary; wherein the judgment portion changes based on a vehicle speed or a deceleration of the vehicle the judgment of whether or not the braking-driving force control is necessary.

7 Claims, 3 Drawing Sheets

(56) References Cited

FOREIGN PATENT DOCUMENTS

| JP | 10-129461 A | 5/1998 |
| JP | 10-157652 A | 6/1998 |
| JP | 10-236289 A | 9/1998 |
| JP | 2000-043705 A | 2/2000 |
| JP | 2000043695 A | 2/2000 |
| JP | 2001206211 A | 7/2001 |
| JP | 2001-219832 A | 8/2001 |
| JP | 2001278019 A | 10/2001 |
| JP | 2003-040095 A | 2/2003 |
| JP | 2007-069907 A | 3/2007 |

\* cited by examiner (A)

(B)

(C)

BEHAVIOR CONTROL DEVICE FOR A
COMBINATION VEHICLE

TECHNICAL FIELD

This invention relates to a behavior control device of a vehicle, such as an automobile, and more specifically to a behavior control device for avoiding or suppressing a jackknife phenomenon in a combination vehicle of a type in which a tractor tows a trailer.

BACKGROUND ART

In a combination vehicle of a type of a semitrailer or a full trailer, in general, a trailer towed by a tractor is pivotably coupled with a pin or a coupler provided on the rear part of the tractor. In such a type of combination vehicle, it is known that a coupling angle (hitch angle) between a tractor and a trailer increases rapidly in the quick braking, quick steering or reverse travelling of the vehicle, so that a "Jackknife phenomenon", namely, a behavioral unstable condition in which the vehicle is bent in the V shape at the pin or the coupler, is liable to occur. Then, so far, there are proposed various solutions for preventing the jackknife phenomenon in a combination vehicle through controlling braking-driving forces on wheels of a tractor and/or a trailer using a braking control device, such as ABS, etc. For example, patent document 1 has proposed a coupler between a tractor and a trailer, which coupler incorporates therein a braking control mechanism which generates a braking force difference between right and left wheels in the trailer to generate a yaw moment in the direction of the decreasing of a hitch angle. Also, patent document 2 discloses controlling independently braking forces of the right and left wheels of a vehicle with a braking control device of an electronic controlled type when a risk of a jackknife phenomenon is detected. Furthermore, in patent documents 3-5, it is proposed to brake a trailer at an early stage for preventing a jackknife phenomenon owing to the pushing of a tractor by the trailer in the start of a yaw moment control of the tractor, in the start of an automatic deceleration control or in the braking during slope descending. And, in patent document 6, it is proposed to prevent a jackknife phenomenon by providing wheels of a trailer with a driving means, such as a motor etc., and adjusting the driving forces of the right and left wheels of the trailer.

Patent document 1: Japanese Laid-open Patent Publication No. 51-108419
Patent document 2: Japanese Laid-open Patent Publication No. 10-1037
Patent document 3: Japanese Laid-open Patent Publication No. 2000-43695
Patent document 4: Japanese Laid-open Patent Publication No. 2000-43705
Patent document 5: Japanese Laid-open Patent Publication No. 2001-278019
Patent documents 6: Japanese Laid-open Patent Publication No 10-157652

SUMMARY OF INVENTION

Objects to be Solved with the Invention

Briefly speaking, a jackknife phenomenon of a combination vehicle as described above is caused due to a pivoting approach of a trailer and a tractor which is insuppressible by tire lateral forces when the directions of the yaw rates of the tractor and trailer are mutually opposite and their difference is large. In the relative pivoting of a trailer and a tractor around a coupling pin to approach to one another, the pivoting kinetic energy or pivoting force (the pivoting action) increases with a vehicle speed and a deceleration. On the other hand, the pivoting force or energy which can be suppressed by a braking control or a yaw rate control of a tractor or a trailer is definite. Thus, in order to prevent a jackknife phenomenon more surely at a high vehicle speed and/or deceleration, it is preferable to perform the reduction of the yaw rate difference between a tractor and a trailer or the suppression of the increase of a hitch angle at an early stage before the relative pivoting action of the trailer and tractor becomes excessive. However, in the conventional behavior control technique for the prevention of a jackknife phenomenon, it is seldom taken into account that the relative pivoting action of a trailer and a tractor may increase with a vehicle speed or deceleration.

Thus, one of the objects of the present invention is to provide a behavior control device for the prevention of a jackknife phenomenon of a combination vehicle in consideration of the increase of the relative pivoting action of a trailer and a tractor in accordance with the increase of a vehicle speed or deceleration.

Further, another object of the present invention is to provide such a behavior control device that executes a yaw rate control of a trailer or a tractor at an early stage at a high vehicle speed and/or deceleration, enabling the suppression of the relative pivoting action of the trailer and tractor prior to its increase.

Means for Solving Objects

As noted above, in the pivoting of a trailer to approach relatively to a tractor in a running combination vehicle, since the kinetic energy of the trailer has become large when its vehicle speed is high, the pivoting action of the trailer has also become large, and, since the inertial force of the trailer has become large when its deceleration is high, the pivoting action of the trailer has become large, too. Namely, the liableness of the occurrence of the pivoting action of the trailer which may cause a jackknife phenomenon varies depending on the magnitudes of the vehicle speed and deceleration. Therefore, in order to prevent a jackknife phenomenon of a combination vehicle more surely, it is preferable to be capable of starting a behavior control in consideration of a vehicle speed or a vehicle deceleration.

Thus, in one aspect of the present invention, a behavior control device of a combination vehicle including a tractor and a trailer pivotably coupled and towed with a coupling pin provided on a rear part of the tractor comprises a braking-driving force control portion which controls a braking-driving force of a tractor or a trailer to reduce a difference between a yaw rate of the tractor and a yaw rate of the trailer, and a judgment portion which judges whether or not a braking-driving force control of the tractor or the trailer by the braking-driving force control portion is necessary, wherein the braking-driving force control portion executes a braking-driving force control when the judgment portion judges that the braking-driving force control is necessary and the judgment portion is designed to change, based on a vehicle speed or a vehicle deceleration, a judgment of whether or not the braking-driving force control is necessary. As already described, the magnitude of the pivoting action of a trailer around a coupling pin relative to a tractor varies depending on a speed or a deceleration of a vehicle. Thus, according to the above-mentioned structure, the necessity of execution of a behavior control which reduces the difference between a yaw rate of a tractor and a yaw rate of a trailer, i.e., the control for preventing a jackknife phenomenon will be judged in accordance with the magnitude of the relative pivoting action of the trailer and tractor, so that the execution of the control for preventing a jackknife phenomenon can be started at a more appropriate time.

Moreover, as noted above, a large pivoting action of a trailer which may cause a jackknife phenomenon is liable to occur at a high vehicle speed or deceleration. Thus, when a vehicle speed or a deceleration is high, it is preferable to suppress a yaw rate difference between a tractor and a trailer at an earlier stage before the conversion of a kinetic energy or an inertial force to the action of the pivoting approach of the trailer. Then, in the above-mentioned inventive device, the judgment portion may be designed to be easier to judge that the braking-driving force control is necessary when a vehicle speed or a vehicle deceleration is high as compared with when the vehicle speed or vehicle deceleration is low. Thereby, at a high vehicle speed or at a high vehicle deceleration, the yaw rate control is performed at an earlier time, so that it is expected that a jackknife phenomenon can be prevented more surely. In this regard, in this structure, the judgment portion may be designed to be easier to judge that the braking-driving force control is necessary as the vehicle deceleration is higher or as the vehicle speed is higher.

In an embodiment of the above-mentioned inventive device, the judgment portion may be designed to judge that the braking-driving force control is necessary when the magnitude of the difference between the yaw rate of the tractor and the yaw rate of the trailer exceeds a predetermined control threshold value. In this case, for one easy structure for making it easier to judge that a braking-driving force control is necessary when a vehicle speed or a vehicle deceleration is high as compared with when the vehicle speed or the vehicle deceleration is low, the control threshold value is reduced when the vehicle speed or the vehicle deceleration is high as compared with when the vehicle speed or the vehicle deceleration is low. Moreover, more concretely, the control threshold value $\gamma\_th$ may be given with an initial value of the control threshold value $\gamma\_o$, a vehicle speed dependent gain $\alpha v$, and a deceleration dependent gain $\alpha g$ by:

$$\gamma\_th = \gamma\_o \cdot \alpha v \cdot \alpha g \quad (1),$$

where the vehicle speed dependent gain $\alpha v$ may be set to decrease with the increase of the vehicle speed, and the deceleration dependent gain $\alpha g$ may be set to decrease with the increase of the deceleration. According this structure, when at least one of the vehicle speed and deceleration of the vehicle is high, the control threshold value is lowered (the control threshold value is further lowered when both the vehicle speed and deceleration are high), so that the behavior control for preventing a jackknife phenomenon will be easier executed, and it is expected that the conversion of the kinetic energy or inertial force into the action of the pivoting approach of the trailer can be more surely obviated.

In the above-mentioned inventive device, the behavior control for preventing a jackknife phenomenon, i.e., the braking-driving force control which reduces the difference between the yaw rate of the tractor and the yaw rate of the trailer may be performed by an arbitrary method. Typically, the braking-driving force control may be done in a manner such that the braking-driving force control portion controls a braking-driving force of a wheel of at least one of the tractor and trailer so as to generate in at least one of the tractor and trailer a yaw moment in the direction of the decreasing of the magnitude of the yaw rate difference between the tractor and the trailer. It should be understood that this yaw moment generation is most preferably attained by producing the difference between the right and left braking forces, but not to be limited to such a manner.

Moreover, the braking-driving force control that reduces a difference between a yaw rate of a tractor and a yaw rate of a trailer need not be performed, for example, if there are no symptoms of a generation of a jackknife or a conversion of a kinetic energy or an inertial force into the action of the pivoting approach of the trailer. Such a symptom of a conversion of a kinetic energy or an inertial force into the action of the pivoting approach of a trailer can be caught, for instance, by referring to the magnitude of a coupling angle or a hitch angle of the tractor and trailer. Then, in an embodiment, the judgment portion may be designed to judge whether or not a braking-driving force control of a tractor or a trailer is necessary, for example, when a coupling angle or a hitch angle between a tractor and a trailer exceeds beyond a predetermined angle.

Effect of Invention

Thus, according to the above-mentioned inventive device, a judgment of whether or not an execution of a behavior control for preventing a jackknife phenomenon is necessary will be made with reference to a vehicle speed and/or a vehicle deceleration, i.e., the strength of a pivoting action in the occurrence of the conversion of a kinetic energy or an inertial force into the action of the pivoting approach of a trailer. Therefore, it is expected that a behavior control will be executed at more appropriate time than ever, so that the generation of the motion of a relative pivoting approach of a tractor and a trailer which may cause a jackknife phenomenon can be obviated. Moreover, especially, according to the manner in which a judgment that a braking-driving force control is necessary is easily made when a vehicle speed and/or a vehicle deceleration are high, the correction of the behavior of a tractor and/or a trailer through the braking-driving force control is started at an earlier stage before excessive progress of the conversion of a kinetic energy or an inertial force to the action of the pivoting approach of the trailer even when the vehicle speed and/or the vehicle deceleration are high, so that the pivoting action to be suppressed will become small, and thus, it is expected that a jackknife phenomenon can be prevented only by braking-driving force control.

Other purposes and advantages of the present invention will be in part clear and pointed out in the followings.

BRIEF EXPLANATION OF THE DRAWINGS

FIG. 1 (B) is a schematic plan view of the vehicle showing a braking system of the vehicle and signal flows of an electronic control device performing the control of the braking system. FIG. 1 (C) shows an internal structure of a behavior control device of a preferable embodiment of the present invention in the form of control blocks.

FIGS. 2 (B) and (C) are schematic plan views of a vehicle illustrating examples of braking-driving force controls of the respective wheels during the execution of a jackknife suppression control. In the drawings, arrows Fb . . . show braking forces generated in the respective wheels in the jackknife suppression control.

FIG. 3 (B) shows the change of a vehicle speed dependent gain αv of a control threshold value relative to a vehicle speed V in a graph form. FIG. 3 (C) shows the change of a deceleration dependent gain αg of a control threshold value relative to a deceleration |Gx| (the absolute value of acceleration and deceleration) in a graph form.

EXPLANATION OF REFERENCE NUMERALS

Figure 1:
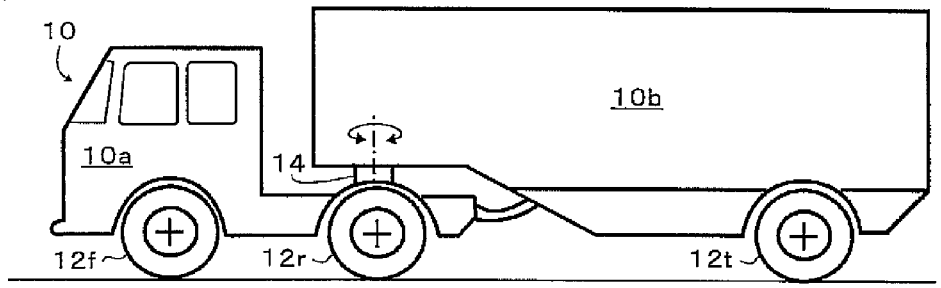
FIG. 1 (A) is a schematic side view of a vehicle on which a behavior control device for preventing a jackknife phenomenon of a preferable embodiment of the present invention is installed.
Figure 1:
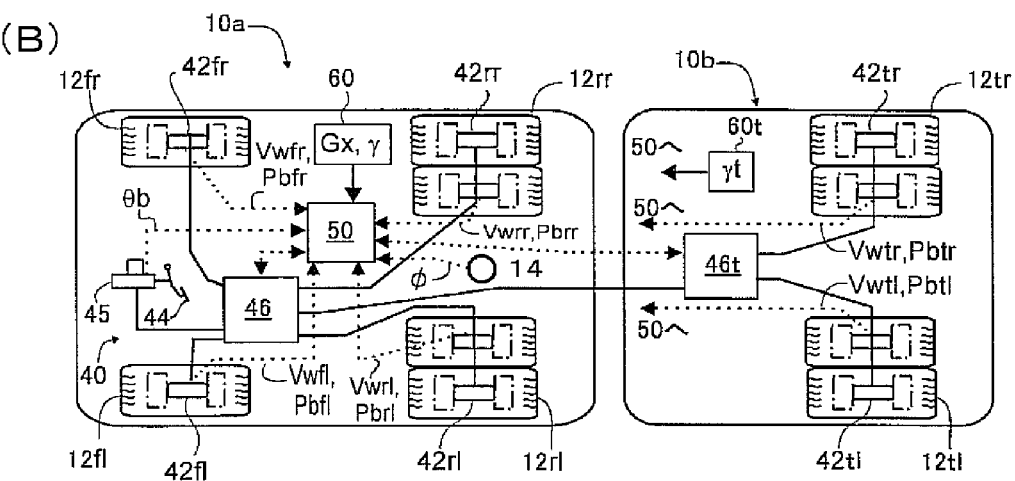
Figure 1:
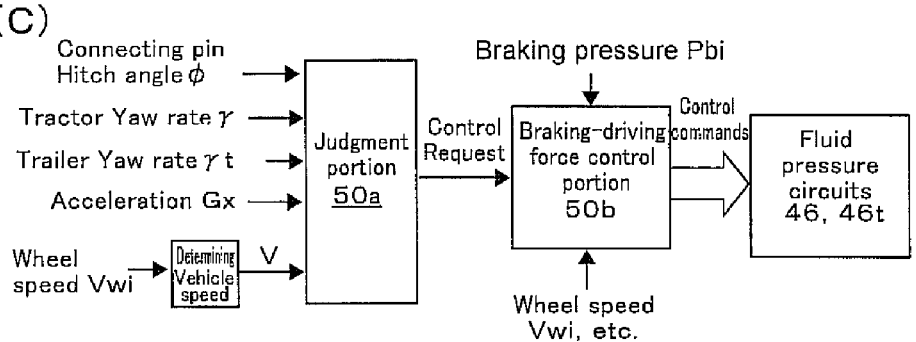

10 . . . Vehicle
10a . . . Tractor
10b . . . Trailer
12fl, fr . . . Tractor front wheel
12rl, rr . . . Tractor rear wheel
12tl, tr . . . Trailer wheel
14 . . . Coupling pin
40 . . . Braking system device
42fl, fr, rl, rr, tl, tr . . . Wheel cylinder
44 . . . Brake pedal
45 . . . Brake valve or Master cylinder
46 . . . Fluid pressure circuit (tractor)
46t . . . Fluid pressure circuit (trailer)
50 . . . Electronic control device
60 . . . Acceleration and deceleration sensor; Yaw rate sensor (tractor)
60t . . . Yaw rate sensor (trailer)

BEST MODE OF THE INVENTION

In the followings, with reference to the accompanying drawings, the present invention is explained in detail with several preferable embodiments. In the drawings, the same reference numerals indicate the same parts.

Structure of the Device

FIG. 1 (A) schematically shows a vehicle 10 on which a preferable embodiment of a behavior control device for suppressing a jackknife phenomenon in accordance with the present invention is installed. The vehicle 10, for example, may be a known arbitrary combination vehicle of a semitrailer type, namely, a combination vehicle which consists of a tractor 10a having a pair of front wheels 12f and a pair of rear wheels 12r, and a trailer 10b having a pair of wheels 12t and coupled to a coupling pin 14 mounted on a rear part of the tractor 10a so as to be capable of pivoting in the directions of the arrow in the drawing. In this regard, although, in the drawing, the vehicle is exemplarily depicted as a semitrailer type truck, the inventive behavior control device may be applied to vehicles, such as a truck of an arbitrary type in which a tractor and a trailer are mutually pivotably coupled so that a jackknife phenomenon may generate (it may be a full trailer type.), a bus, etc., and also, it should be understood that such a case is included within the scope of the present invention.

Braking each wheel of the combination vehicle 10 is performed by a braking system 40, as schematically shown in FIG. 1 (B), which can control a braking force of each wheel independently. Briefly, the braking system 40 is, typically, an electronic controlled, air pressure type braking system, air and hydraulic (composite type) braking system or hydraulic braking system, and comprises a fluid pressure circuit 46 which adjusts braking pressures in wheel cylinders 42fl, fr, rl, rr, equipped on the front wheels 12fl, fr, and the rear wheel 12rl, rr of the tractor 10a, namely, braking forces of the respective tractor wheels; and a fluid pressure circuit 46t which adjusts braking pressures in wheel cylinders 42tl, tr equipped on the trailer wheel 12tl, tr of the trailer 10b, namely, braking forces of the respective trailer wheels. The fluid pressure circuit 46 of the tractor 10a is provided, in a usual manner, with various valves (a modulator, a fluid pressure holding valve, a pressure reducing valve, etc.) which connect the wheel cylinders of the respective wheels selectively to an air compressor, an air tank, a braking force booster device, a lubricating oil pump, an oil reservoir, etc. (not shown) and a brake pipe which transmits a fluid pressure to the fluid pressure circuit 46t of the trailer 10b, and the fluid pressure circuit 46t of the trailer 10b is provided with various valves (a modulator, a fluid pressure holding valve, a pressure reducing valve, etc.) which give the fluid pressure from the fluid pressure circuit 46 of the tractor 10a selectively to the wheel cylinders of the trailer wheels. In a usual braking operation, the brake valve (or master cylinder) 45 operates in response to depression of a brake pedal 44 by a driver, and the pressure of the air tank, braking booster device or master cylinder is supplied to each wheel cylinder 42i (i=fl, fr, rl, rr, tl and tr. It is the same in the following), and thereby braking forces are generated on the respective wheels simultaneously. However, when the braking force of each wheel is adjusted individually or independently in order to execute a motional control, such as an ABS control, VSC, a control for preventing or avoiding a jackknife phenomenon (jackknife suppression control) by the inventive behavior control device, or other arbitrary braking force distribution control, the above-mentioned various valves are operated based on control commands of an electronic control device 50, and thus, the braking pressure in the wheel cylinder of each wheel is individually controlled based on a detected value of the corresponding pressure sensor so as to conform to each target pressure.

The electronic control device 50 may include a microcomputer of a normal type, having a CPU, a ROM, a RAM, and an input/output port apparatus, and drive circuits which are mutually connected through bidirectional common buses, and to the electronic control device 50, there are inputted detected values, such as a brake pedal depression amount θb from a depression amount sensor (not shown) provided in the brake pedal 44, wheel speeds Vwi from wheel speed sensors (not shown) provided on the respective wheels, pressures Pbi in the wheel cylinders of the respective wheels from wheel cylinder pressure sensors, an acceleration Gx and a tractor yaw rate γ from a longitudinal G sensor and a yaw rate sensor 60 provided in the tractor, a trailer yaw rate γt from a yaw rate sensor 60t provided in the trailer, a hitch angle (a coupling angle between the tractor and trailer) φ from an angle sensor (not shown) provided in the coupling pin, etc. (Other than illustrated ones, various detected signal indicating various parameter values, such as lateral acceleration, required in various controls to be performed in the vehicle of this embodiment may be inputted.).

FIG. 1 (C) shows the inventive behavior control device incorporated into the electronic control device 50 in the form of a block diagram. With reference to this drawing, in the inventive behavior control device, there are constructed a judgment portion 50a which judges whether or not a jackknife suppression control is necessary, and a braking-driving force control portion 50b which controls a braking-driving force of each wheel in order to perform a jackknife suppression control according to the control request of the judgment portion 50a. In more details, according to processing operations described later, the judgment portion 50a reads in the hitch angle φ of the coupling pin, the tractor yaw rate γ, the trailer yaw rate γt, the longitudinal acceleration and deceleration Gx of the vehicle and a vehicle speed V determined by an arbitrary method from the wheel speed values Vwi of the respective wheels; judges whether or not a jackknife suppression control is to be started and whether or not a jackknife suppression control is to be stopped; and transmits the judgment result (control request) to the braking-driving force control portion 50b. The braking-driving force control portion 50b, when directed to execute a jackknife suppression control, determines, in an arbitrary manner, target values of braking pressures or braking forces to be applied to the respective wheels based upon information such as braking pressures Pbi or wheel speeds Vwi of the respective wheels, etc. for generating a yaw moment in either or both of the tractor and the trailer in the direction of the decreasing of the magnitude of the difference between the tractor yaw rate γ and trailer yaw rate γt or in the direction of the decreasing of the magnitude of the tractor yaw rate γ or the trailer yaw rate γt, and sends control commands to the respective portions in the fluid pressure circuits 46 and 46t so that said target values will be achieved. In this connection, it should be understood that the judgment portion 50a and the braking-driving force control portion 50b are realized by the processing operations of the CPU and the other elements according to programs which have been memorized in a storage devices, such as a memory in the electronic control device 50.

Operation of the Device

Figure 2:
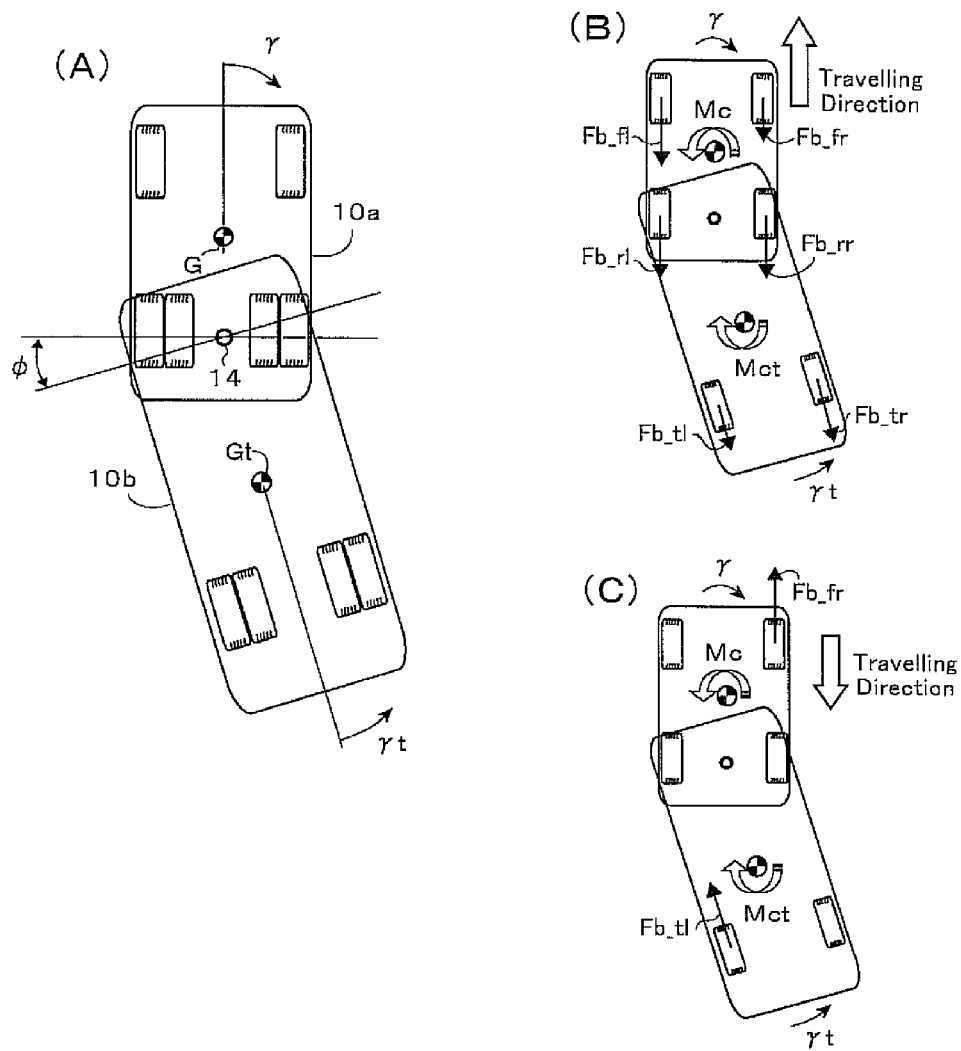
FIG. 2 (A) is a schematic plan view of a vehicle explaining about parameters to be referred to in the judgment portion of the inventive behavior control device.

Referring to FIG. 2 (A), the jackknife phenomenon, namely the excessive increasing of the hitch angle φ of the coupling pin 14 of a combination vehicle, is caused because tire lateral forces cannot suppress the pivoting approach of the trailer and tractor when the directions of the yaw rate γ of the tractor 10a around its centroid G and the yaw rate γt of the trailer 10b around its centroid Gt are opposite to each other and their difference |γ−γt| becomes large during the braking, quick steering or reverse travelling of the vehicle. Especially, at a high vehicle speed, since the kinetic energy of the vehicle is large, the conversion of this large kinetic energy into the energy of the relative pivoting approach of the tractor and trailer would enlarge their pivoting action. Also, at a high vehicle deceleration, since the inertial force exerted on the vehicle becomes large, the conversion of this large inertial force into the force of the relative pivoting approach of the tractor and trailer would enlarge their pivoting action. Based on the above-mentioned knowledge, the inventive device is designed to be capable of executing a jackknife suppression control i.e., a control for generating on a tractor and/or a trailer a yaw moment in the direction of the decreasing of the magnitude of the yaw rate difference between the tractor and trailer much earlier when the vehicle speed and/or deceleration are high (see FIGS. 2 (B) and (C)), and thereby it is tried to prevent or suppress the conversion of a large kinetic energy or an inertial force of the vehicle into the pivoting action in the relative pivoting approach of the tractor and trailer.

Figure 3:
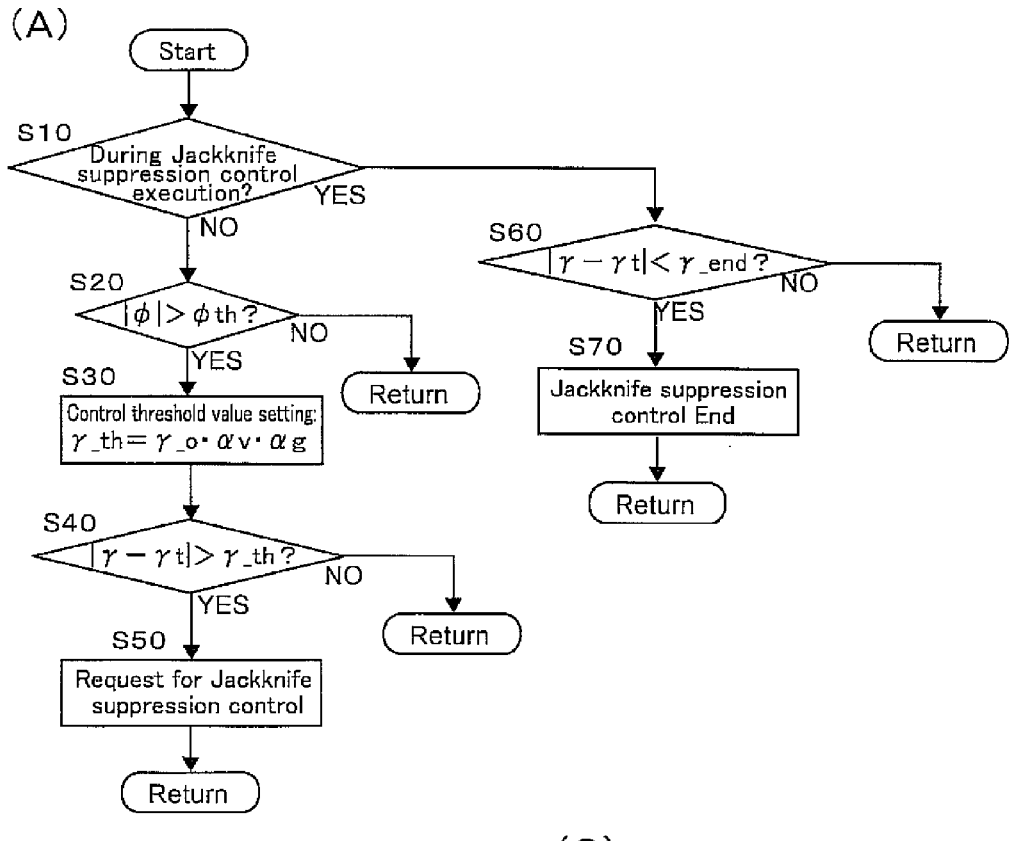
FIG. 3 (A) shows the flow of a process of the inventive behavior control device in the form of a flow chart.
Figure 3:
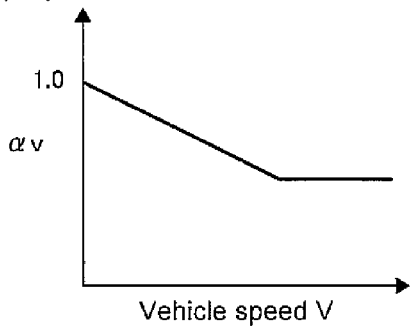
Figure 3:
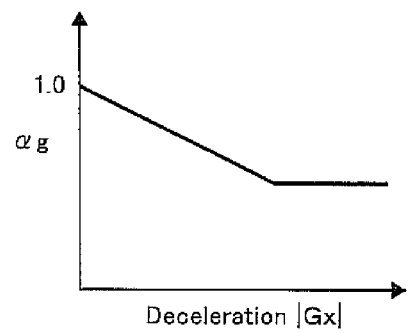

FIG. 3 (A) shows in a form of a flow chart a processing operation of the judgment portion 50a for executing a jackknife suppression control at an earlier stage when a vehicle speed and/or deceleration are high as described above. In the control process of the judgment portion 50a, briefly, when the magnitude of a hitch angle φ and the magnitude of a yaw rate difference between a tractor and a trailer |γ−γt| exceeds a predetermined threshold angle value and a control threshold value, respectively, an execution of a jackknife suppression control is requested. And, in this judgment of the request for the execution of the jackknife suppression control, the control threshold value for judging the magnitude of the yaw rate difference of the tractor and trailer is changed depending on the vehicle speed and deceleration. In this regard, the illustrated control process is repetitively executed at a predetermined cycle during the running of the vehicle.

Concretely, referring to FIG. 3 (A), when a jackknife suppression control has not been performed yet (step 10), first, it is judged whether or not the magnitude (absolute value) of a hitch angle φ is larger than a predetermined angle φth, namely, if $$|\phi| > \phi th \qquad (2)$$

is satisfied (step 20). When the condition (2) is satisfied here, this indicates that there has arisen a deviation between the directions of the tractor and trailer, and accordingly there exists a possibility or a symptom that the kinetic energy or inertial force of the trailer or tractor will convert into the relative pivoting action between the trailer and tractor (When the condition (2) are not satisfied, a control cycle is repeated without performing any further process). Then, in this case, a control threshold value γ_th for judging whether or not an execution of a jackknife suppression control is necessary is set by the following formula (step 30):

$$\gamma\_th = \gamma\_o \cdot \alpha v \cdot \alpha g \qquad (3),$$

where γ_o is an initial value of the control threshold value (This value may be set experimentally or theoretically in an arbitrary manner). αv is a vehicle speed dependent control gain, which is set to decrease with the increase of the magnitude of the vehicle speed V as illustrated in FIG. 3 (B). And, αg is a deceleration dependent control gain, which is set to decrease with the increase of the deceleration (the absolute value of the acceleration and deceleration value Gx during braking in a vehicle running forward and the absolute value of the acceleration and deceleration value Gx during driving in a vehicle running backward) as illustrated in FIG. 3 (C). Thus, the control threshold value γ_th is set to be lowered when the vehicle speed V and/or the deceleration Gx become higher.

Then, when the control threshold value γ_th is set, it is judged whether or not the magnitude of the yaw rate difference between the tractor and trailer |γ−γt| exceeds beyond the control threshold value γ_th, namely, if $$|\gamma - \gamma t| > \gamma\_th \qquad (4)$$

is satisfied (step 40). Here, when the condition (4) is satisfied, this indicates that a jackknife phenomenon is liable to occur, and thus, a request for an execution of a jackknife suppression control is given to the braking-driving force control portion 50b (step 50). And then, the braking-driving force control portion 50b starts the correction of the behavior of the tractor and/or trailer in several of manners described later.

In this respect, it should be understood here that, since the control threshold value γ_th is set to be lower as the vehicle speed V and/or the deceleration Gx becomes higher, the request for an execution of a jackknife suppression control is generated at a smaller yaw rate difference |γ−γt| at the higher vehicle speed V and/or the higher deceleration Gx, namely, as the possibility that the pivoting action which may cause a jackknife phenomenon will be enlarged becomes higher. In the other words, as the vehicle speed V and/or the deceleration Gx become higher, the execution of a jackknife suppression control is easier to be started, and thereby, the behavior of the tractor/trailer is corrected at an earlier stage and it becomes more surely possible to obviate a jackknife phenomenon than ever. (In step 40, when the condition (4) is not satisfied, the control cycle is repeated without performing any process.)

A jackknife suppression control performed by the braking-driving force control portion 50b may be done in an arbitrary way. For instance, in a case that braking is performed during the forward travelling of a vehicle, as illustrated in FIG. 2 (B), in the tractor, the braking force (Fb_fl in the drawing) of the wheel in the side opposite to the direction of the yaw rate may be more increased than the braking forces of the other wheels, or in the trailer, the braking force (Fb_tr in the drawing) of the wheel of the same side as the direction of the yaw rate may be more increased than the braking forces of the other wheels, so that, in the tractor or trailer, a yaw moment Mc or a yaw moment Mct can be generated in the direction of the decreasing of the hitch angle of the coupling pin, respectively. Also, in the reverse travelling of a vehicle, as illustrated in FIG. 2 (C), in the tractor, the braking force (Fb_fr in the drawing) of the wheel of the same side as the direction of the yaw rate may be more increased than the braking forces of the other wheels, or in the trailer, the braking force (Fb_tl in the drawing) of the wheel in the side opposite to the direction of the yaw rate may be more increased than the braking forces of the other wheels, and accordingly, also, in the tractor or trailer, a yaw moment Mc or a yaw moment Mct can be generated in the direction of the decreasing of the hitch angle of the coupling pin, respectively. In this regard, a control yaw moment in the direction of the decreasing of a hitch angle of a coupling pin is preferably generated in both of the tractor and trailer, but, the control yaw moment may be generated only in either one of the tractor or trailer. Further, in the illustrated example, the yaw moment in the vehicle body is generated by the braking force difference between the right and left wheels, but, in a case that the distribution of driving forces in the respective wheels is possible, the same yaw moment may be generated by a driving force difference between right and left wheels (A yaw moment given to a vehicle body or the magnitude of braking-driving forces of the respective wheels may be determined in the same manner as an arbitrary VSC).

An execution of a jackknife suppression control, once started as described above, may be ended when the yaw rate difference $|\gamma-\gamma t|$ becomes smaller than an end threshold value $\gamma\_end$. In the illustrated control process, after a jackknife suppression control start, the jackknife suppression control being executed is judged in step 10, and subsequently, in step 60, if $$|\gamma-\gamma t|<\gamma\_end \quad (5)$$

is satisfied, the stop of the jackknife suppression control is commanded to the braking-driving force control portion 50b (step 70). In this regard, the end threshold value $\gamma\_end$ for a jackknife suppression control may be changed with the increase in a vehicle speed or deceleration similarly to the control threshold value $\gamma\_th$ (It may be the same as the control threshold value $\neq\_th$.).

Thus, according to the above-mentioned inventive device, the criterion for determining whether or not an execution of a jackknife suppression control is necessary is varied in accordance with a vehicle speed or deceleration, and thereby, at a high vehicle speed or deceleration, a jackknife suppression control is easy to be executed so that it is expected that a jackknife phenomenon can be more surely obviated through correcting the behavior of a tractor or a trailer at an early stage.

Although this invention has been explained above in detail with respect to particular cases of embodiments, this invention is not limited to the above-mentioned embodiments, and it is apparent for ones skilled in the art that other various embodiments are possible within the scope of the present invention.

For example, using wheel speeds of right and left wheels, the yaw rates of a tractor and a trailer may be given by:

$$\text{Yaw rate} = \text{right and left wheel speed difference/tread} \quad (6)$$

In that case, no yaw rate sensor need be used. Moreover, since the differential value of a hitch angle $\phi$ of a coupling pin is equivalent to a yaw rate difference $\gamma-\gamma t$ between a tractor and a trailer, the judgments in steps 40 and 60 of FIG. 3 (A), namely, the judgment of whether or not a jackknife suppression control is necessary may be done by judging if the absolute value of the differential value of a coupling pin hitch angle $\phi$ is greater than a control threshold value or an end threshold value (In the other words, a jackknife suppression control is performed so that the absolute value of the differential value of a coupling pin hitch angle $\phi$ will become small). In that case, an angle sensor which detects the hitch angle of a coupling pin need not be used.

Furthermore, the dependency of a control gain on a vehicle speed or a deceleration as illustrated in FIG. 3 (B), (C) may be set experimentally or theoretically in an arbitrary manner so as to be adapted to the actual structure and/or characteristics of a vehicle, and thus, it should be understood that the dependency of the control gain is not limited to the illustrated examples.

The invention claimed is:

1. A behavior control device of a combination vehicle including a tractor and a trailer pivotably connected with a coupling pin mounted on a rear part of the tractor and towed therewith, comprising:
   a braking-driving force control portion which controls a braking-driving force of the tractor or the trailer to reduce a difference between a yaw rate of the tractor and a yaw rate of the trailer; and
   a judgment portion which judges whether or not a braking-driving force control of the tractor or the trailer by the braking-driving force control portion is necessary;
   wherein the braking-driving force control portion executes the braking-driving force control when the judgment portion judges that a magnitude of the difference between the yaw rate of the tractor and the yaw rate of the trailer exceeds a predetermined control threshold value $\gamma\_th$, and wherein the judgment portion lowers the predetermined control threshold value $\gamma\_th$ based on an increase in a magnitude of a deceleration of the vehicle so as to make it easier to apply the braking-driving force to correct the behavior of the tractor or the trailer at an earlier stage,
   wherein the predetermined control threshold value $\gamma\_th$ is given with an initial value of the control threshold value $\gamma\_o$ that is multiplied by a deceleration dependent gain $\alpha g$,
   wherein the deceleration dependence gain $\alpha g$ decreases with an increase in the magnitude of deceleration.

2. The device of claim 1, wherein the judgment portion is easier to judge that the braking-driving force control is necessary when the magnitude of the vehicle deceleration is high as compared with when the magnitude of the vehicle deceleration is low.

3. The device of claim 1, wherein the predetermined control threshold value $\gamma\_th$ is lowered when the magnitude of the vehicle deceleration is high as compared with when the magnitude of the vehicle deceleration is low.

4. The device of claim 1, wherein the judgment portion is easier to judge that the braking-driving force control is necessary as the magnitude of the vehicle deceleration is higher.

5. The device of claim 1, wherein the judgment portion is easier to judge that the braking-driving force control is necessary when a vehicle speed of the vehicle is high than when the vehicle speed is low.

6. The device of claim 1, wherein the predetermined control threshold value $\gamma\_th$ is given with the initial value of the control threshold value $\gamma\_o$, a vehicle speed dependent gain $\alpha v$ and the deceleration dependent gain $\alpha g$ by $$\gamma\_th = \gamma\_o \cdot \alpha v \cdot \alpha g,$$

where the vehicle speed dependence gain $\alpha v$ decreases with an increase of the vehicle speed.

7. The device of claim 1, wherein, in an execution of the braking-driving force control, the braking-driving force control portion controls a braking-driving force of a wheel in at least one of the tractor and the trailer so that a yaw moment is generated in at least of the tractor or the trailer in a direction of decreasing of the magnitude of the yaw rate difference between the tractor and the trailer.

* * * * *